United States Patent
Takeuchi

(10) Patent No.: US 6,189,921 B1
(45) Date of Patent: Feb. 20, 2001

(54) AIR BELT DEVICE

(75) Inventor: Hiroyuki Takeuchi, Hikone (JP)

(73) Assignee: Takata Corporation, Tokyo (JP)

( * ) Notice: Under 35 U.S.C. 154(b), the term of this patent shall be extended for 0 days.

(21) Appl. No.: 09/145,275

(22) Filed: Sep. 2, 1998

(30) Foreign Application Priority Data

Sep. 2, 1997 (JP) .................................................. 9-236905

(51) Int. Cl.⁷ .................................................. B60R 21/18
(52) U.S. Cl. .......................................................... 280/733
(58) Field of Search ................. 280/733, 801.1, 280/728.1; 297/468

(56) References Cited

U.S. PATENT DOCUMENTS

| 3,706,463 | * | 12/1972 | Lipkin ................................... | 280/733 |
| 3,929,205 | * | 12/1975 | Takada et al. ........................ | 280/733 |
| 4,348,037 | * | 9/1982 | Law et al. ............................. | 280/733 |
| 5,288,104 | | 2/1994 | Chen ..................................... | 280/733 |
| 5,472,231 | | 12/1995 | France .................................. | 280/733 |
| 5,511,820 | * | 4/1996 | Hatfield ................................ | 280/733 |
| 5,556,129 | * | 9/1996 | Coman et al. ........................ | 280/733 |
| 5,839,753 | * | 11/1998 | Yaniv et al. .......................... | 280/733 |
| 5,851,055 | * | 12/1998 | Lewis ................................... | 297/483 |

FOREIGN PATENT DOCUMENTS

| 43 05 505 | | 9/1993 | (DE) . |
| 0 592 815 | | 4/1994 | (EP) . |
| 10236256 | * | 9/1998 | (JP) . |
| 97/23367 | | 3/1997 | (WO) . |

* cited by examiner

*Primary Examiner*—Paul N. Dickson
(74) *Attorney, Agent, or Firm*—Foley & Lardner

(57) ABSTRACT

An inflatable body 32 is attached to a webbing 18 of the seat belt device 16 and a gas generator device 36 which is mounted in the upper portion of a seat back 14 supplies a gas into the inflatable body to inflate the inflatable body 32. The inflatable body 32 is enveloped between covers 38, 40. The inflatable body 32 can be attached to the webbing 18 by fastening hooks 46 formed along an upper cover 38 to the webbing 18.

4 Claims, 5 Drawing Sheets

AIR BELT DEVICE

BACKGROUND OF THE INVENTION

This invention relates to an air belt device, more particularly to an air bag device which is equipped in a vehicle to protect an occupant who sits in a seat, in a collision. This air belt device reduces the force that the occupant receives from a webbing, when an inflatable body that is attached to the webbing of the seat belt device is inflated along the webbing at the time of a collision.

A seat belt device having an inflatable body attached to a webbing is shown in Japanese Laid-Open Patent Publication No. 63-39462. The air bag is folded into a cover in this seat belt device. The air bag folded into the cover is attached to the webbing. A gas generator device is provided inside the air bag to expand the air bag. All the weight of the gas generator device loads on the webbing in this air belt device. This device has a disadvantage that the weight of gas generator device presses against the chest or abdomen of the occupant as a result.

The purpose of this invention is to provide an air belt device that does not allow the weight of the gas generator device to press against the chest or abdomen of the occupant. Thus the occupant feels comfortable when the air belt device is used.

THE SUMMARY OF THE INVENTION

This invention comprises a seat belt device for protecting an occupant in a vehicle, an inflatable body being attached to a webbing of the seat belt device and a gas generator device supplying a gas to inflate the inflatable body characterized in that said gas generator device is mounted in the upper portion of a seat back.

According to this air belt device, the gas generator device is mounted in the upper portion of a seat back so that no weight of the gas generator device loads to the occupant.

It is preferred that the air belt device has an inflatable body including an air bag being disposed along the webbing and a cover enveloping the air bag, said cover having hooks that are fastened along the webbing to attach the inflatable body to the webbing. According to this air belt device, it becomes easy to attach or detach the inflatable body to or from the webbing.

It is preferred that an air belt device has a gas generator device further including a freely rotating cap connected to the inflatable body for supplying the gas from the gas generator device into the inflatable body. According to this air belt device, the rotating cap can rotate following the movement of the webbing. As a result, the torsion or twisting stress and the like load to the inflatable body is reduced.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
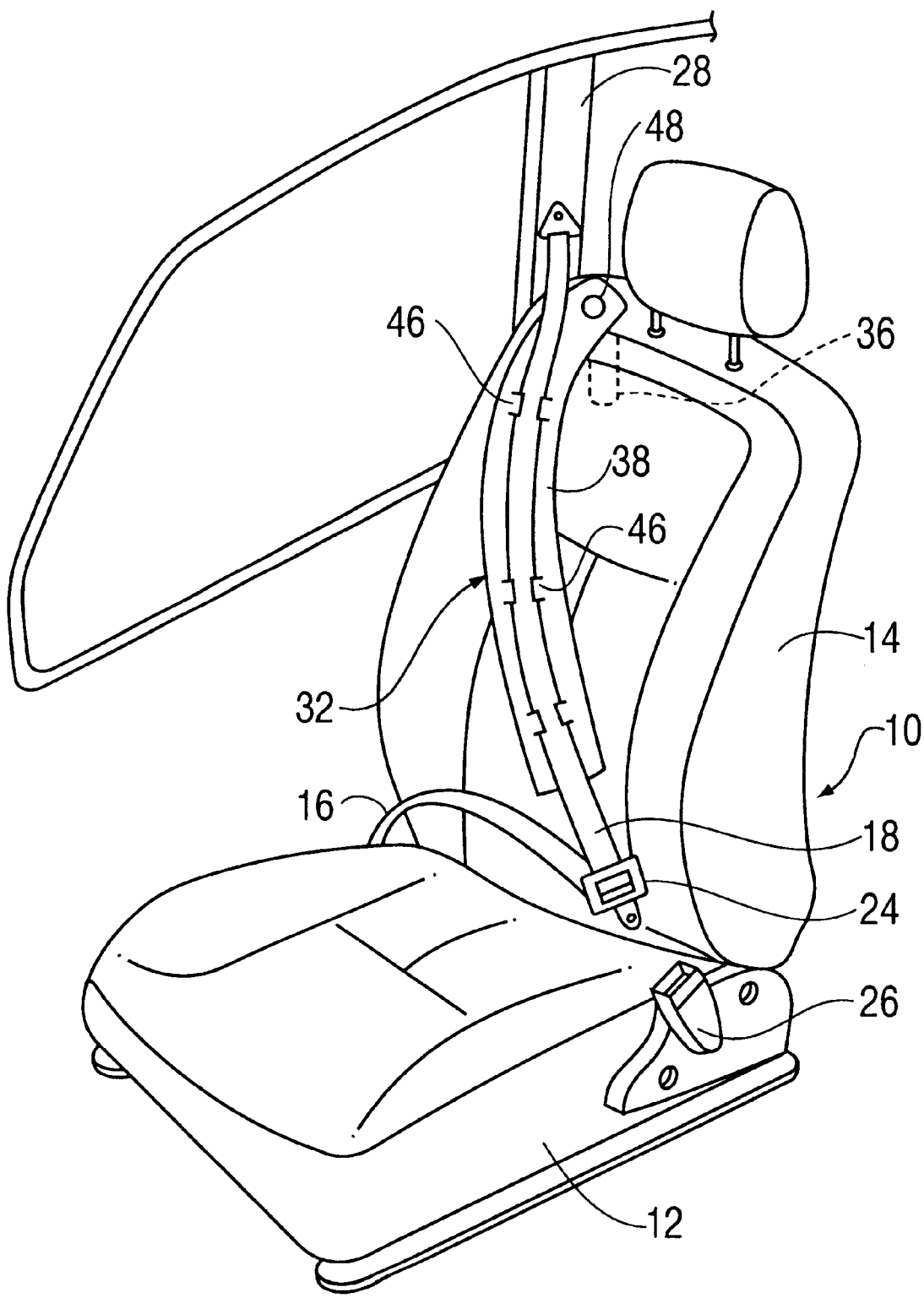
FIG. 1 is a perspective view showing an embodiment of the air belt device in the vehicle's interior.
Figure 2:
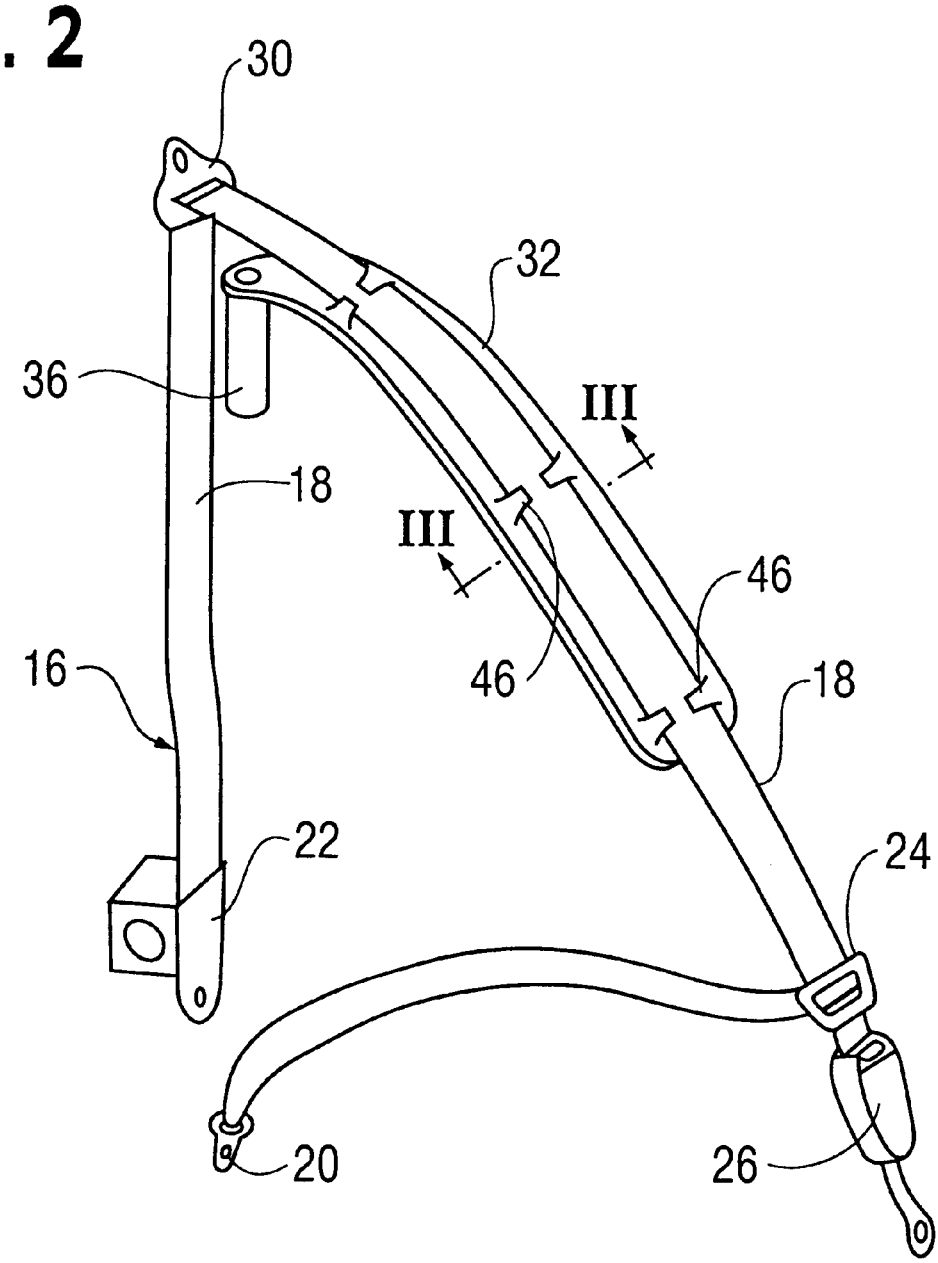
FIG. 2 is a perspective view showing an embodiment of the air belt device.
Figure 3:
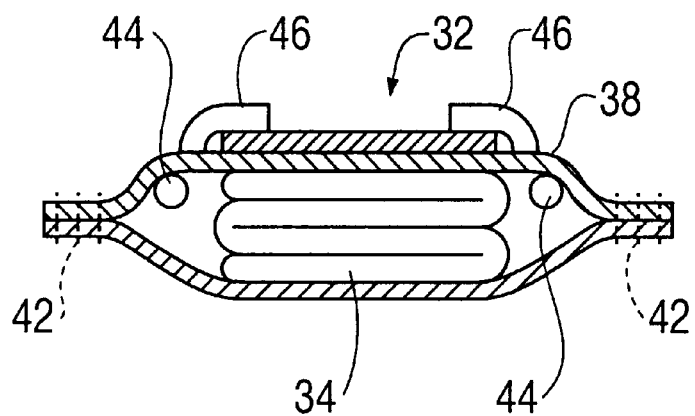
FIG. 3 is a sectional view showing along line III—III in FIG. 2.
Figure 4:
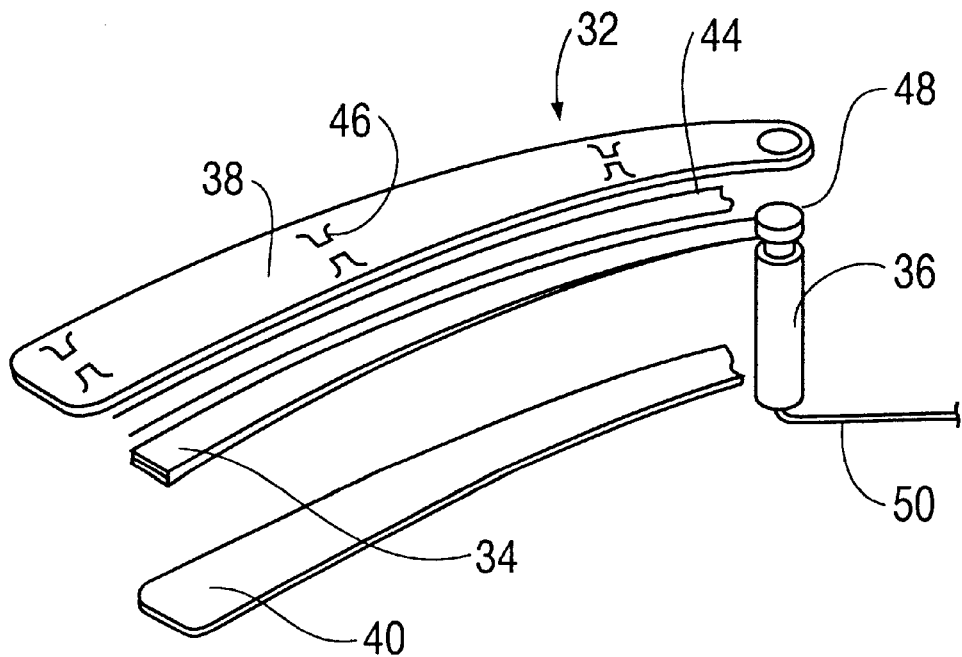
FIG. 4 is an exploded perspective view of the inflatable body.
Figure 5:
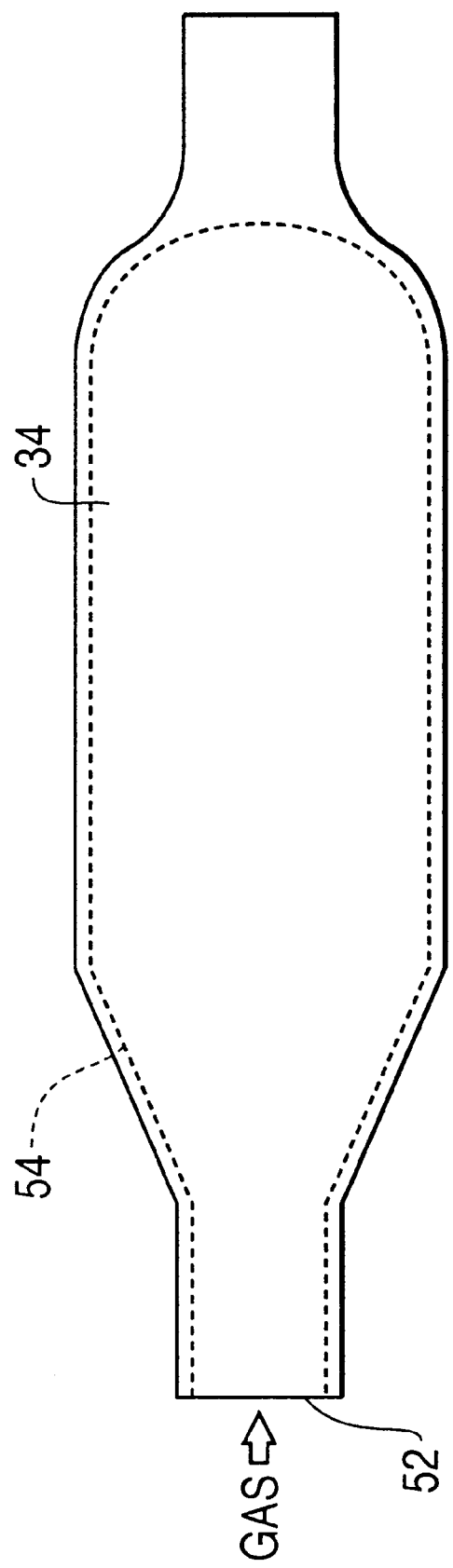
FIG. 5 is a plan view of the air bag.
Figure 6A:
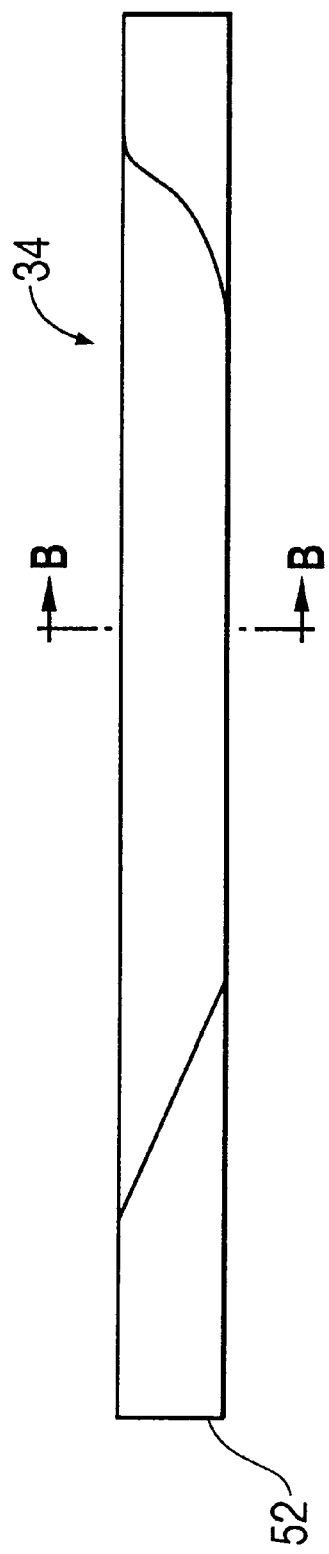
FIGS. 6(a)–6(d) are plan view and sectional views of the folded air bag.
Figure 6D:
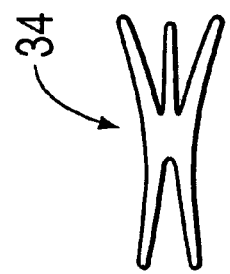
Figure 6C:
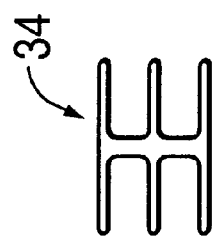
Figure 6B:
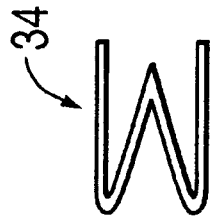

An embodiment of an air bag device according to this invention is now described referring to the attached drawings below. FIG. 1 shows inside of the vehicle equipped with the air belt device in the embodiment of this invention. FIG. 2 shows an air belt device according to the invention. FIG. 3 is a sectional view showing along line III–III in FIG. 2. FIG. 4 is an exploded perspective view of the inflatable body. FIG. 5 is a plan view of the air bag. FIGS. 6(a) is a plan view of the air bag folded, FIGS. 6(b)–6(d) are sectional views of the folded air bag, showing alternative cross sections along line B—B in FIG. 6(a).

Seat belt device 16 is installed on or attached in seat 10 that comprises a seat cushion 12 and a seat back 14 as shown in FIG. 1.

This seat belt device 16 includes webbing 18, an anchor 20 fixing a webbing 18 in the body of an automobile, a retractor 22 winding the end of the webbing 18, a tongue 24 attached to the mid part of the webbing 18, a buckle 26 in to which that the tongue 24 is inserted and a shoulder anchor 30 that hangs the webbing 18 on the center pillar 28.

Inflatable body 32 is attached in or mounted on this webbing 18. Also, a gas generator device 36 that supplies gas to air bag 34 of this inflatable body 32 is installed in the upper part of seat back 14.

As shown in FIGS. 3 and 4, inflatable body 32 is equipped with upper cover 38 and also lower cover 40 that envelop the air bag 34. The covers 38, 40 may be joined by adhesion or melting, although as shown they are joined by sewing thread 42. The strength of the connection between cover 38, 40 is lower than the tear force that occurs when air bag 34 inflates.

An axle or core bar 44 having the rigidity of metal or a synthetic resin is inserted into the inflatable body 32. The axle 44 is formed to the U-shape that is disposed along both sides of belt-shaped inflatable body 32. Inserting the axle 44 into inflatable body 32, the axle 44 can prevent the distortion or twisting of this inflatable body 32.

Hooks 46 are provided on the upper cover 38 for attaching inflatable body 32 to webbing 18. In this embodiment, hooks 46 are formed by providing upper cover 38 with Ω-shaped cuts and raising the material. When the inflatable body 32 is attached along the webbing, hooks 46 are raised by the rift and fastened to the webbing.

A rotating cap 48 is provided to the gas generator device 36. The end of the air bag 34 is connected to the rotating cap 48. The gas from the gas generator device 36 is supplied into air bag 34 through the rotating cap 48. A harness 50 that supplies an operational current is connected to the gas generator device 36.

As shown in FIGS. 5 and 6(a)–6(d), the form of the air bag 34 is rectangular or a long bag shape, which has the connection mouth 52 connected to the rotating cap on one end.

In this embodiment, the air bag is layered with 2 sheets of cloth that are sewn along the edge of the circumference of the cloth by sewing thread 54. In FIG. 6(*a*), air bag 34 is folded up in a long rectangular belt state, as a whole by making a tuck in the wide part of the width. FIGS. 6(*b*), 6(*c*) and 6(*d*) are the sectional views that show the folding example of the wide part of the width of this air bag 34. The air bag 34 can be folded up with either of FIGS. 6(*b*), 6(*c*) and 6(*d*). Needless to say, it is clear that other methods to fold up the air bag can be used.

In the air belt device that is equipped with the inflatable body 32 attached to the webbing 18, the gas generator device 36 operates and then the air bag 34 inflates in a collision. At this time, the joint between covers 38, 40 tears and air bag 34 unfolds to a long cylindrical form along the webbing 18. In this way, the impact that the occupant receives from webbing 18 significantly decreases.

In accordance with the invention, the gas generator device 36 of the air bag is attached in seat back 14, as shown in FIG. 1. All the weight of the gas generator does not act on the occupant. Accordingly, as for this air belt device the weight of gas generator device does not press against the chest or abdomen of the occupant unlike conventional technology. Especially in this embodiment, the upper part of inflatable body 32 is connected to the rotating cap 48 which acts as a pivot. Inflatable body 32 can revolve around the rotating cap 48 freely. Therefore the air belt device gives almost no discomfort to the occupant. Also, the load or stress that is applied to inflatable body 32 is reduced prolonging the life of inflatable body 32.

As explained above, the air belt device according to the present invention applies no gas generator device weight to the occupant, who can wear the air belt device with great comfort.

Furthermore, according to another aspect of the air belt device of the invention, the inflatable body can be attached to and detached from the webbing easily. The air belt device according to another aspect of the invention reduces the load that is added to the inflatable body. It is thus possible to prolong the life and prevent the deterioration of inflatable body.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

This application is one of seven copending applications filed on even date herewith:

| U.S. Serial No. | Our Docket No. | Japanese No. |
| --- | --- | --- |
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |
| Unknown | 086142/0209 | 09-236910 |

The instant application hereby incorporates by reference the entire specification including claims and abstract and the drawings of each of the other six applications.

What is claimed is:

1. An air belt device comprising:

a seat belt device for protecting an occupant in a vehicle;

an inflatable body attached to a webbing of the seat belt device;

a core bar in the inflatable body; and a gas generator device supplying a gas to inflate the inflatable body, wherein the gas generator device is mounted in the upper portion of a seat back.

2. An air belt device according to claim 1, wherein the inflatable body includes an air bag disposed along the webbing and an upper cover and a lower cover enveloping the air bag, the upper cover having hooks that are disposed along the webbing to attach the inflatable body to the webbing.

3. An air belt device according to claim 2, wherein the gas generator device further includes a rotating cap connected to the inflatable body for supplying the gas from the gas generator device into the inflatable body.

4. An air belt device according to claim 1, wherein the gas generator device further includes a rotating cap connected to the inflatable body for supplying the gas from the gas generator device into the inflatable body.

\* \* \* \* \*